(12) United States Patent
Maki et al.

(10) Patent No.: US 6,466,555 B2
(45) Date of Patent: *Oct. 15, 2002

(54) MOBILE RADIO COMMUNICATIONS SYSTEM

(75) Inventors: Takeshi Maki, Yokohama; Toshiro Suzuki, Tama; Yuji Fukai, Machida; Kenichi Aoyama, Kamakura, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/983,718

(22) Filed: Oct. 25, 2001

(65) Prior Publication Data

US 2002/0031106 A1 Mar. 14, 2002

Related U.S. Application Data

(63) Continuation of application No. 09/273,483, filed on Mar. 22, 1999, now Pat. No. 6,333,923, which is a continuation of application No. 08/631,301, filed on Apr. 9, 1996, now Pat. No. 5,901,144.

(30) Foreign Application Priority Data

Apr. 13, 1995 (JP) .............................................. 7-087924

(51) Int. Cl.$^7$ ................................................ H04Q 7/00
(52) U.S. Cl. ...................................... 370/330; 370/331
(58) Field of Search ................................ 370/328, 329, 370/330, 331, 332, 436; 455/436, 437, 438, 439, 440, 441, 442

(56) References Cited

U.S. PATENT DOCUMENTS

| | | | |
|---|---|---|---|
| 5,228,029 A | 7/1993 | Koizin | |
| 5,265,263 A | 11/1993 | Ramsdale et al. | 455/441 |
| 5,483,668 A | 1/1996 | Malkamaki et al. | |
| 5,513,380 A | 4/1996 | Ivanov et al. | 455/441 |
| 5,519,691 A | 5/1996 | Darcie et al. | |
| 5,575,971 A | 11/1996 | Aihara | 455/441 |
| 5,787,348 A | 7/1998 | Willey et al. | 455/441 |
| 5,983,104 A | 11/1999 | Wickman et al. | 455/441 |

OTHER PUBLICATIONS

Trend of Digital Cordless Telephone System Bulletin of the Institute of Electronics, Information and Communication Engineers, Jun. 1984.

Hitachi Review vol. 72, No. 9, pp. 17–22.

British Telecom Technology Journal vol. 8, No. 1, pp. 79–84.

*Primary Examiner*—Ajit Patel
(74) *Attorney, Agent, or Firm*—Antonelli, Terry, Stout & Kraus, LLP

(57) ABSTRACT

A mobile radio communications system having a plurality of base stations accommodating a plurality of mobile stations through radio transmission channels, each of the base stations being connected to a mobile communications exchanger through a plurality of signal lines. Each of the base stations is provided therein with a signal line allocating function unit for selecting a particular signal line from a plurality of signal lines and for allocating a communication slot for a mobile station dominated by the base station at a particular slot position on the selected signal line, a radio channel allocating function unit for allocating a communication slot for the mobile station dominated by the base station at a particular slot position on a radio transmission channel at a particular frequency, and a radio signal delay control unit for performing delay control for a timing at which the base station transmits a radio signal to the mobile station dominated by the base station.

2 Claims, 7 Drawing Sheets

MOBILE RADIO COMMUNICATIONS SYSTEM

This is a continuation of application Ser. No. 09/273,483, filed Mar. 22, 1999, now U.S. Pat. No. 6,333,923; which is a continuation of application Ser. No. 08/631,301, filed Apr. 9, 1996, now U.S. Pat. No. 5,901,144.

BACKGROUND OF THE INVENTION

The present invention relates to a mobile radio communications system which realizes the utilization of public communication networks with mobile stations.

Conventionally, the personal handy phone system (PHS) regarded as a type of mobile radio communications systems has a problem that a cell, i.e., a radio zone covered by a base station is so small that a handover operation for switching from one cell to another is frequently performed during the high speed movement of a user making a call with a mobile station, whereby the call is temporarily interrupted for several seconds every time the handover operation is performed, thus largely affecting the degradation of communication quality.

Communications systems for the personal handy phone system have been described in an article "Trends of Digital Cordless Telephones" (Transactions of the Institute of Electronics, Information and Communication Engineers, Vol. 77, No. 6, pp 636–642) about a concept of technical specifications for the systems.

In a personal handy phone system for public communications, each mobile station, when moving from one radio zone to another, automatically re-initiates a call in the destination radio zone, thus autonomously realizing the handover operation only by a normal call operation, without any particular intervening handover related operation from the network side. The first edition of the second-generation cordless telephone system standard (RCR STD-28) published by Radio Wave System Development Center Foundation (RCR) defines that the personal handy phone systems for public communications shall employ the above-mentioned re-call handover operation scheme.

The employment of the re-call handover operation scheme enables mobile stations to switch a radio zone only with a normal call operation without any particular operational intervention from the network side, thus providing a simplified handover operation. However, a mobile station needs to re-initiate a call in a destination radio zone every time it performs a handover operation as it is moving from a radio zone to another, so that the communication is interrupted during a handover operation for a time period required for the re-initiation which may delay several seconds. Since a radio zone coverage is quite small in the personal handy phone system, if a call is being made while moving at a speed higher than a slow speed of a vehicle, the handover operation will be repeated so frequently that interruptions of a call, caused by the handover operation, will occur at short intervals to an innegligible degree.

Assume for example that a mobile station is moving at 60 kilometers per hour (km/h), and a radio zone covered by a base station has a diameter of approximately 100 meters (m). A simple calculation based on these assumed values shows that the handover operation is performed every six seconds, and a call is interrupted for several seconds at each handover operation, thus presenting a problem that a precise communication quality cannot be ensured.

FIG. 1 illustrates an example of the configuration of a conventional personal handy phone system for showing how the position of a communication slot transits on signal lines (500) and on radio transmission channels (300a)–(300c) when the handover operation is performed each time a mobile station (100) moves from a radio zone to an adjacent radio zone.

In the conventional personal handy phone system as illustrated, when the mobile station (100) under communication is moving from a radio zone (200a) to an adjacent radio zone (200b) and further to another radio zone (200c) covered by respective base stations (400a)–(400c) in succession, the mobile station (100) re-initiates a call to a mobile communications exchanger (600) through a corresponding base station (400a)–(400c) forming the radio zone (200a)–(200c), each time the mobile station (100) enters a new radio zone (200a)–(200c), to carry out the handover operation. Since a call is again set each time the mobile station (100) moves from the radio zone (200a) to (200b) and from (200b) to (200c), the position of the communication slot for this call is different on the signal lines (500) and on the radio transmission channels (300a)–(300c) in the respective base stations (400a)–(400c).

A technique for switching a pertinent radio zone without performing the handover operation as a mobile station moves from a radio zone to another may be represented by a communications system adapted by the Japanese Shinkansen for its transportation service and public telephone service. However, since the network side detects movements of respective trains from one radio zone to next and realizes the switching of the radio zones by the control performed on the network side, a movement detecting means and a radio zone switching control means are required on the network side. While the provision of these means is effective in a system having a relatively small number of base stations, a system employing a concentrated control scheme for the radio zone switching, or the like, it is difficult to apply the same to the personal handy phone system which includes a large number of base stations, each of which autonomously performs the radio zone switching.

SUMMARY OF THE INVENTION

The present invention has been made in view of the problems mentioned above, and its principal object is to reduce the number of times the handover operation is performed in a fast moving mobile station to reduce the occurrence of call interruptions caused by the handover operation, thus ensuring a precise communication quality for such a fast moving mobile station in a mobile radio communications system.

To achieve the above object, the present invention provides a mobile radio communications system having a function of autonomously switching a base station connected to a fast moving mobile station under communication among base stations installed along a moving route of the mobile station in succession without performing an handover operation, thus making it possible to reduce the frequency of occurrence of the handover operation in the fast moving mobile station under communication.

Means for solving the problem of the present invention are described in detail as follows.

According to the present invention, there is provided a mobile radio communications system having a plurality of base stations accommodating a plurality of mobile station through radio transmission channels, each mobile station connected with a mobile communications exchanger through a plurality of signal lines, each of the signal lines parallelly connected to the plurality of base stations, each base station including a mechanism of selecting a particular signal line from the plurality of signal lines and allocating a communication slot for a mobile station dominated by the base station at a particular slot position on the selected signal line, and a mechanism of allocating a communication slot for the mobile station dominated by the base station at a particular slot position of a radio transmission channel at a particular frequency, wherein each base station autonomously allocates a frequency of a radio transmission channel and a time slot on the radio transmission channel used by a mobile station dominated by the base station, when the mobile station was dominated by an adjacent base station, for the mobile station dominated by the base station, in accordance with a lapse of a fixed time period calculated from a previously assumed moving speed of a moving mobile station under communication, each base station allocates a signal line and a communication slot on the signal line used by the mobile station dominated by the base station, when the mobile station was dominated by the adjacent base station, for the mobile station dominated by the base station, and the moving mobile station autonomously switches a base station to which the moving mobile station is connected, successively among the plurality of base stations installed along a moving direction of the moving mobile station under communication, without intervention of operations on the network side and without performing a handover operation.

According to the present invention, there is provided the mobile radio communications system characterized in that each base station further comprises radio signal delay control means capable of variably setting a delay time for a transmission timing when each base station transmits a signal to a mobile station accommodated in an associated radio zone associated with the base station, so that when the respective base stations transmit digital modulated signals to a mobile station, the respective base stations mutually match the phases of their time-division multiplexed channel slots allocated for time-division multiplexed digital modulated signals sent from the respective base stations onto associated radio transmission channels and transmitted to the mobile station.

According to the configuration of the present invention described above, a base station connected to a fast moving mobile station under communication is autonomously switched among base stations installed along a moving route of the mobile station in succession without performing an handover operation to suppress the occurrence of the handover operation in the fast moving mobile station under communication, thereby making it possible to reduce the occurrence of call interruptions caused by the handover operation and to ensure a precise communication quality for the fast moving mobile station in the mobile radio communications system.

DESCRIPTION OF THE PREFERRED EMBODIMENTS

The present invention will hereinafter be described with reference to one embodiment.

Figure 1:
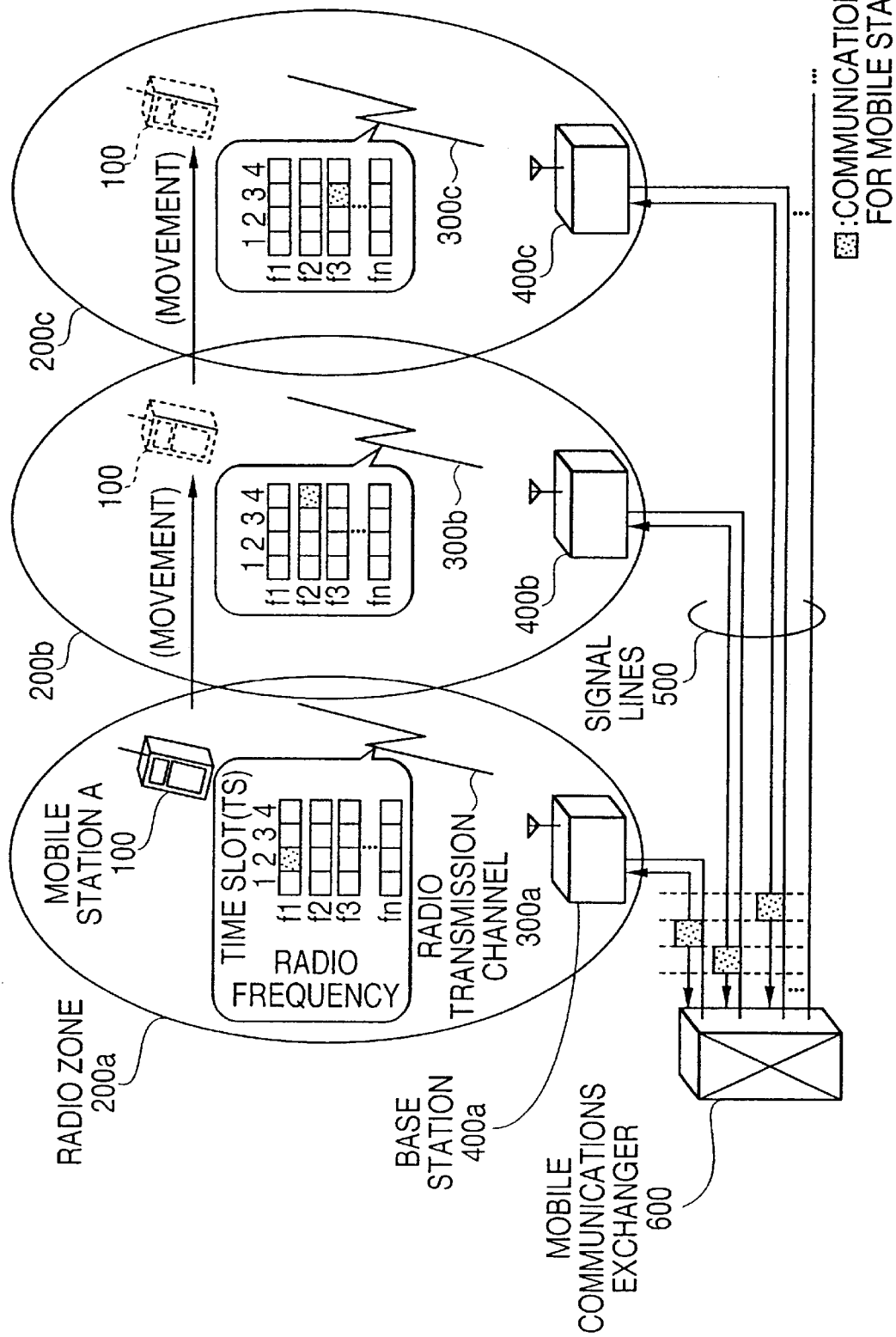
FIG. 1 is a diagram illustrating the configuration of a conventional personal handy phone system and a concept of the handover operation.
Figure 2:
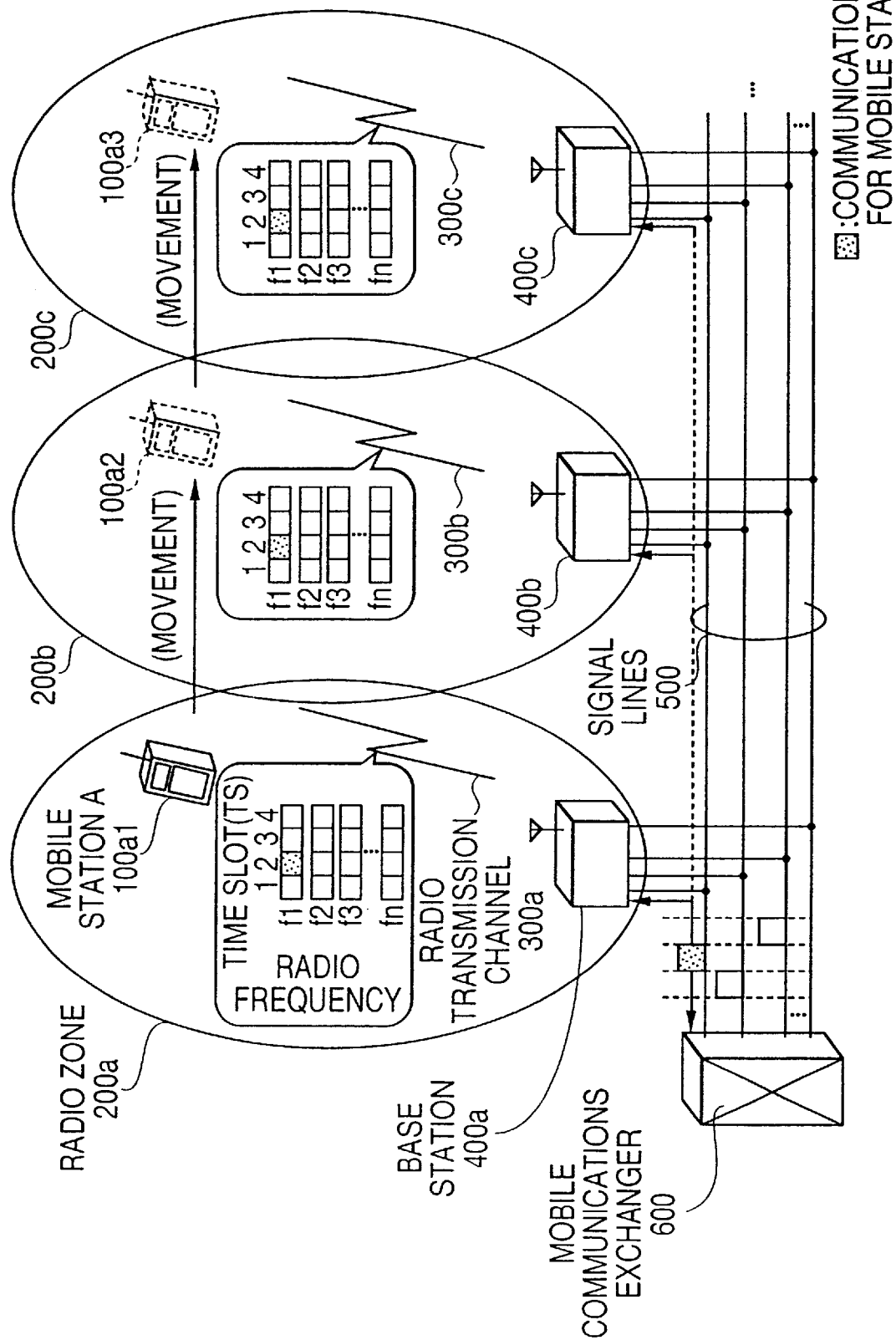
FIG. 2 is a diagram illustrating the configuration of a personal handy phone system according to the present invention and a concept of a radio zone switching operation.

FIG. 2 illustrates the configuration of one embodiment of a personal handy phone system according to the present invention and an example of how the position of a communication slot transits on a signal line (500) and on radio transmission channels (300*a*)–(300*c*) due to a handover operation caused by a movement of a mobile station (100).

As illustrated in FIG. 2, the mobile radio communications system of the embodiment comprises a plurality of base stations (400*a*)–(400*c*) which accommodate mobile stations (100*a*1)–(100*a*3) existing in radio zones (200*a*)–(200*c*) through radio transmission channels (300*a*)–(300*c*), wherein the respective base stations (400*a*)–(400*c*) are parallelly connected to a mobile communications exchanger (600) through a plurality of signal lines (500), each of which is connected to corresponding one of the plurality of mobile stations (400*a*)–(400*c*).

More specifically, in the personal handy phone system illustrated as an embodiment, each of the plurality of base stations (400*a*)–(400*c*) has a function of transmitting and receiving radio signals to and from a plurality of mobile stations (100); a function of modulating and demodulating radio signals transmitted to and received from the plurality of mobile stations (100); a function of performing delay control for the timing of transmitting signals to mobile stations (100) dominated thereby through the radio transmission channels (300*a*)–(300*c*); a function of selecting a particular frequency for an associated radio transmission channel, through which radio signals are transmitted to and received from the mobile station (100), and allocating communication slots at particular slot positions on the radio transmission channels (300*a*)–(300*c*) for the mobile stations (100) dominated thereby; and a function of selecting a particular signal line (500) from the plurality of signal lines (500) through which digital signals are transmitted to and received from the mobile communications exchanger (600), and allocating a communication slot for each of the mobile station (100) dominated thereby at a particular slot position on the selected signal line (500).

In one embodiment of the personal handy phone system according to the present invention, as the moving mobile station (100) under communication is successively moving from the radio zone (200*a*) to the radio zone (200*b*) and to the radio zone (200*c*), covered by the respective base stations (400*a*)–(400*c*), the respective base stations (400*a*)–(400*c*) autonomously allocate the frequency of the radio transmission channels. (300*a*)–(300*c*) and the same time slot on the radio communication channels (300*a*)–

(300c), used by the mobile station (100) when it was dominated by the preceding base stations (400a)–(400c), to the mobile station (100) in the radio zones (200a)–(200c) covered thereby, in accordance with a fixed time calculated from a previously assumed moving speed of the moving mobile station (100) under communication. Also, the respective base stations (400a)–(400c) allocate the same signal line (500) and the same communication slot on the signal line (500), used by the mobile station (11) when it was dominated by the preceding base stations (400a)–(400c), to the mobile station (100) on the signal lines (500) between the base stations (400a)–(400c) and the mobile communications exchanger (600). In this way, the position of the communication slot used by the mobile station (100) is the same on the signal line (500) and the radio communication channels (300a)–(300c) while the mobile station (100) moves from the base station (400a) to the base station (400b) and further to the base station (400c), as illustrated in FIG. 2. This operation realizes the switching of a radio zone to which the mobile station (100) belongs, without performing any handover operation or without any intervention of control operations on the network side.

Figure 3:
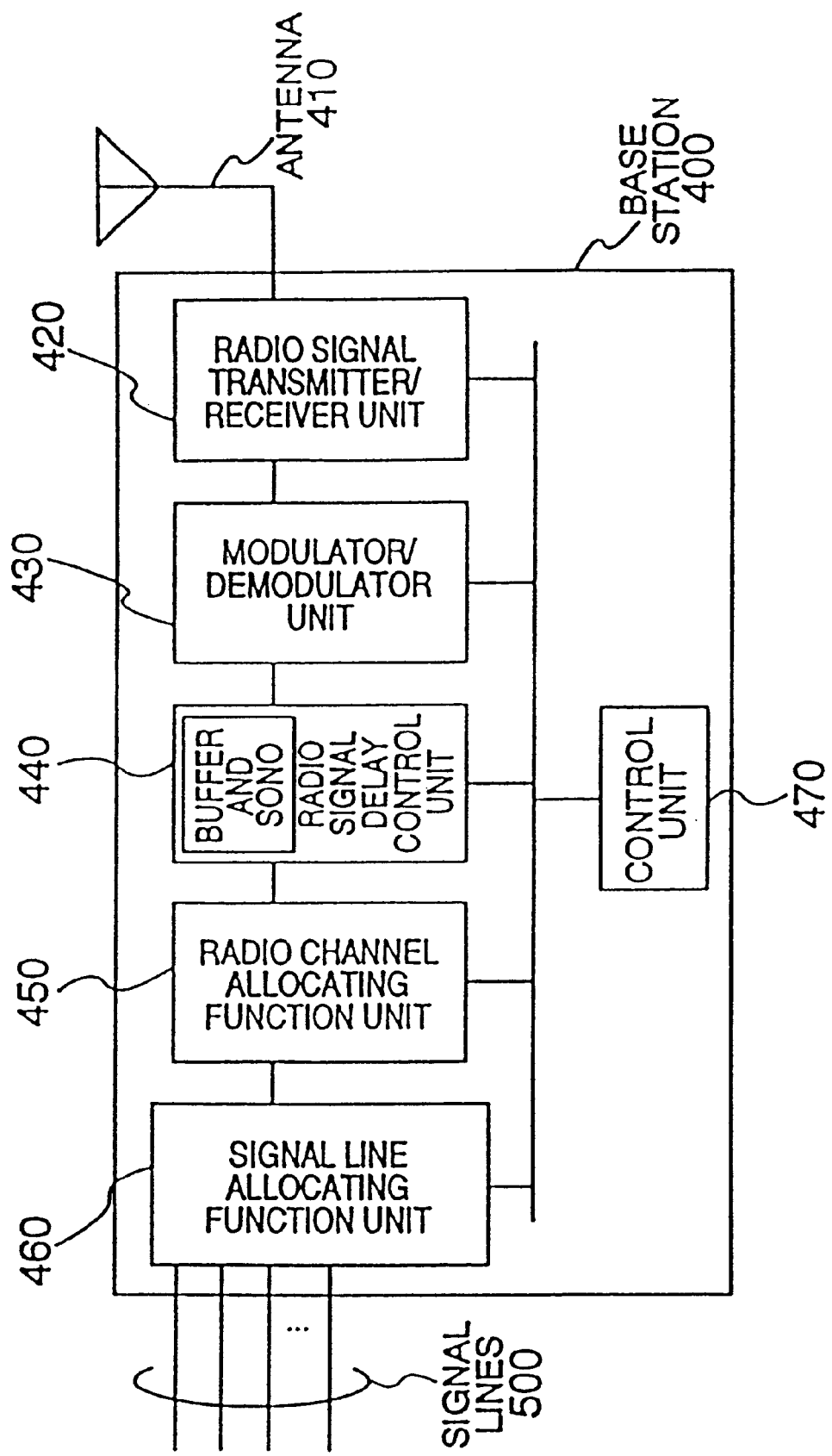
FIG. 3 is a functional block diagram schematically illustrating an internal configuration of a base station in the personal handy phone system according to the present invention.

FIG. 3 schematically illustrates the configuration of internal functional blocks of the base stations (400a)–(400c). Each of the base stations (400a)–(400c) is composed of an antenna (410), a radio signal transmitter/receiver unit (420), a modulator/demodulator unit (430), a radio signal delay control unit (440), a radio channel allocating function unit (450), a signal line allocating function unit (460), and a control unit (470) for generally controlling these functional blocks.

The radio channel allocating function unit (450), operable under the control of the control unit (470), has a function of selecting a particular frequency for an associated radio transmission channel (300a)–(300c) on which radio signals are transmitted to and received from a mobile station (100), and of allocating a communication slot at a particular slot position on the associated radio transmission channel (300a)–(300c) for the mobile station (100) dominated by an associated base station (400a)–(400c).

The signal line allocating function unit (460), operable under the control of the control unit (470), has a function of selecting particular one from the plurality of signal lines (500) as a signal line (500) through which digital signals are transmitted to and received from the mobile communications exchanger (600), and of allocating a communication slot on a particular slot position on the selected signal line (500) for a mobile station (100) dominated by the associated base station.

The radio signal delay control unit (440) has a function of providing a transmission timing with a delay of a previously set time, when a digital signal received from the mobile communications exchanger (600) destined to a mobile station (100) dominated by an associated base station is modulated by the modulator/demodulator unit (430) and transmitted by the radio signal transmitter/receiver unit (420) to the mobile station (100) dominated by the associated base station through the antenna (410).

Next, the processing of the system according to this embodiment will be generally described with reference again to FIGS. 2 and 3.

Assuming that a mobile station (100) under communication located in a radio zone (200a) formed by a base station (400a) is moving to another radio zone (200b) and further to a radio zone (200c) in succession at a high speed. At the timing an estimated moving time of the mobile station (100) to the radio zone (200b) has elapsed, a frequency and a communication slot occupied by the mobile station (100) for transmission and reception on the radio transmission channel (300a) of the preceding base station (400a) are also allocated as a frequency and a communication slot for the mobile station (100) on the radio transmission channel (300b) of the adjacent base station (400b) which exists in the middle of the moving route of the mobile station (100). In addition, a communication slot on the signal line (500) occupied by the mobile station (100) when dominated by the base station (400a) is also used in the adjacent base station (400b) which exists in the middle of the moving route of the mobile station (100). At this time, the preceding base station (400a) releases the communication slot on the radio transmission channel (300a) and the communication slot on the signal line (500) occupied by the mobile station (100) for another mobile station. For the estimation of the moving time of the mobile station (100) from the radio zone (200a) to the radio zone (200c), a fixed value suitable for an environment to which the personal handy phone system according to the present invention is applied is assumed, and a particular fixed value is previously calculated as an estimated value of the moving time from intervals at which base stations (400a)–(400c) are installed in the environment to which the personal handy phone system is applied and the assumed moving speed value of the mobile station (100). For example, when the personal handy phone system according to the present invention is applied to highways, a fixed value of 80 km/h is assumed as a moving speed of a mobile station (100). And assuming also that base stations (400a), (400b), (400c) are installed at intervals of 200 m on the highways, an estimated value of a moving time of the mobile station (100) between the radio zones (200a) and (200b) or (200b) and (200c) is calculated as 200 m÷80 km/h=approximately 9 seconds.

In this way, by allocating communication slots on the signal line (500) and on the radio transmission channels (300a)–(300c) in accordance with the estimated moving time of the mobile station (100) between the radio zones (200a) and (200b), the mobile station (100) can continue a communication without performing the re-call handover operation or without requiring the intervention of control operations on the network side, when the mobile station (100) moves from the preceding radio zone (200a) to the adjacent radio zone (200b). A transfer of the communication slot on the radio transmission channels (300a)–(300c) in the radio zones (200a)–(200c) is realized by the operations performed by the radio channel allocating function unit (450) in the preceding base station (400a) and by the radio channel allocating function unit (450) in the adjacent or destination base station (400b), while a transfer of the communication slot on the signal line (500) between the base stations (400a) and (400b), and (400b) and (400c) is realized by the operations performed by the signal line allocating function unit (460) in the preceding base station (400a) and by the signal line allocating function unit (460) in the destination or adjacent base station (400b).

In this way, between the adjacent base stations (400a) and (400b), and (400b) and (400c), existing in the middle of the moving route of the mobile station (100), in accordance with the estimated moving time of the mobile station (100) from the radio zone (200a) to the radio zone (200c), a communication slot for the mobile station (100) is successively transferred on the radio transmission channels (300a)–(300c) from the radio zone (200a) to the radio zone (200b) and from the radio zone (200b) to the radio zone (200c), and a communication slot on the signal line (500) is successively transferred from the base station (400*a*) to the base station (400*b*) and from the base station (400*b*) to the base station (400*c*), whereby the mobile station (100) under communication, even during high speed movement, can continue a communication successively through destination base stations without the need of performing the handover operation, thus largely reducing the frequency of the handover performed by the fast moving mobile station (100) under communication. In addition, the intervention of special control operations on the network side is not either required.

Further, when the mobile station (100) moves from the radio zone (200*a*) to (200*b*) and from (200*b*) to (200*c*) in succession at a high speed, the radio signal delay control units (440) provided in the respective base stations (400*a*)–(400*c*) control the timing of transmitting radio signals from the respective base stations (400*a*)–(400*c*) to their subordinate radio transmission channels (300*a*)–(300*c*) in accordance with values previously set for the respective base stations (400*a*)–(400*c*), such that a communication slot phase on the radio transmission channel (300*a*) of the original base station (400*a*) is synchronized with a communication slot phase on the radio transmission channel (300*b*) of the destination or adjacent base station (400*b*) and also such that a communication slot phase on the radio transmission channel (300*b*) of the base station (400*b*) is synchronized with a communication slot phase on the radio transmission channel (300*c*) of the adjacent base station (400*c*), whereby the phases of the communication slots on the radio transmission channels (300*a*)–(300*c*) transmitted from the respective base stations (400*a*)–(400*c*), viewed from the fast moving mobile station (100) under communication, can be all synchronized with each other.

As described above, by synchronizing the communication slot phases with each other on the radio transmission channels (300*a*)–(300*c*) over the respective radio zones (200*a*)–(200*c*), it is possible to largely reduce noise or the like caused by communication slots falling into out-of-synchronization when the mobile station (100) moves from the radio zone (200*a*) to (200*b*) and from (200*b*) to (200*c*).

It will be appreciated from the foregoing that a precise communication quality can be ensured for the fast moving mobile station (100).

When the moving time of the mobile station (100) from the radio zone (200*a*) to the radio zone (200*c*) is estimated, if there is a mobile station (100) moving at a speed different from a speed assumed as a moving speed of the mobile station (100), the conventional handover operation will be required at the timing a communication slot on the radio transmission channel (300*a*) in the radio zone (200*a*) is transferred to the radio transmission channel (300*b*) in the radio zone (200*b*) and from the radio transmission channel (300*b*) to the radio transmission channel (300*c*) in the radio zone (200*c*) and at the timing a communication slot on the signal line (500) is transferred from the base station (400*a*) to the base station (400*b*) and from the base station (400*b*) to the base station (400*c*). However, if a relative speed |v–v1| between the assumed moving speed v and an actual moving speed v1 of the mobile station (100) is equal to or less than a slow speed of a vehicle at which the frequency of call interruptions due to the handover operation is regarded to cause no problem, a degradation of the communication quality due to the call interruptions can be suppressed to a level at which a precise communication quality can be ensured even in the conventional personal handy phone system. For example, assuming that the personal handy phone system according to the present invention is applied to highways with an assumed moving speed of a mobile station (100) set at a fixed value of 80 km/h, a precise communication quality can be ensured if the relative speed of the mobile station to this assumed moving speed is equal to or less than a slow speed of a vehicle. Specifically, assuming that a slow speed of a vehicle is approximately 30 km/h, if the mobile station runs at 50 km/h–110 km/h or less, a precise communication quality can be ensured.

Figure 4:
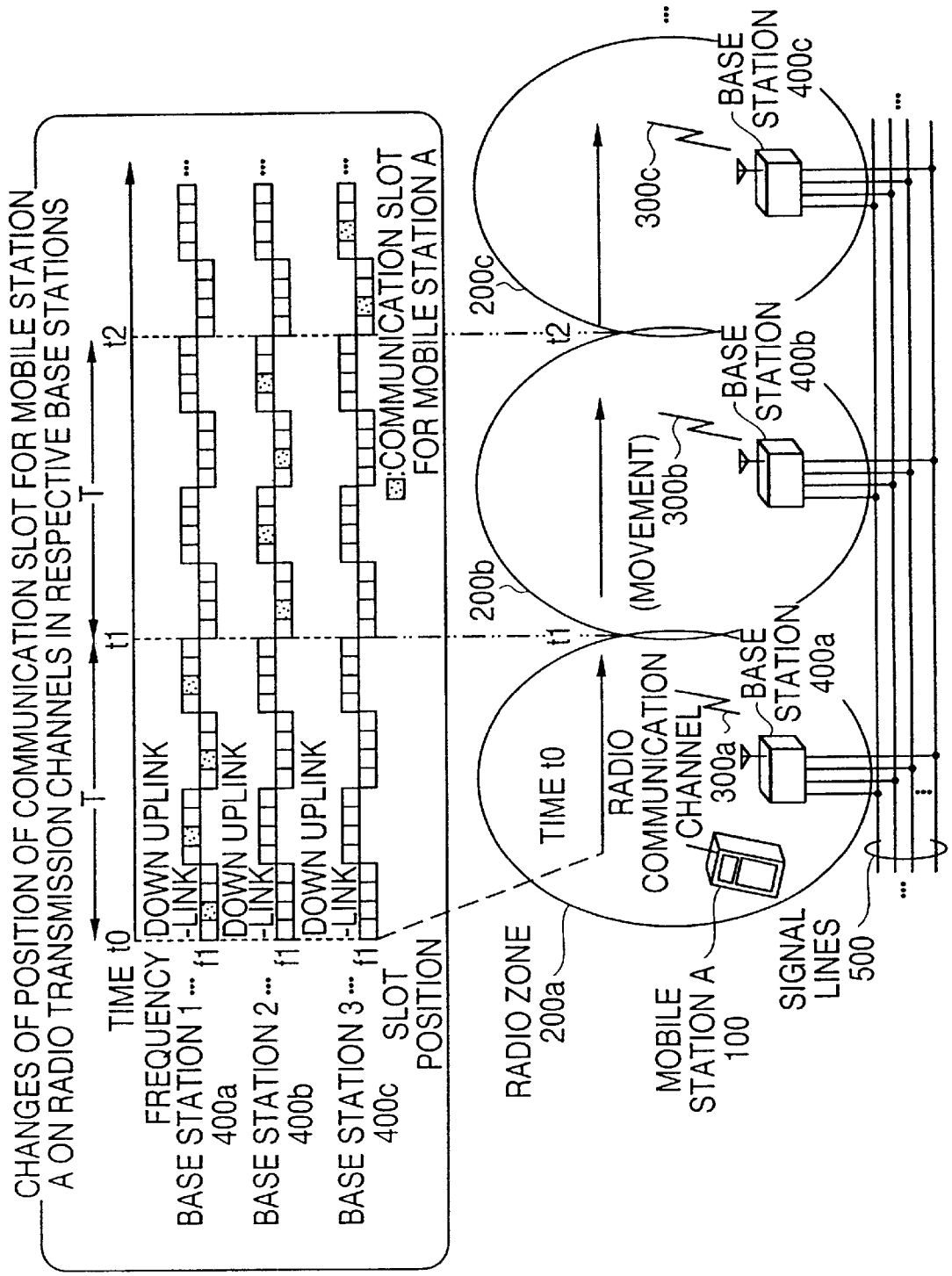
FIG. 4 is a diagram illustrating changes of the position of a communication slot for a mobile station, in the process of time, on radio transmission channels in respective radio zones in one embodiment of the personal handy phone system according to the present invention.

FIG. 4 is a diagram illustrating changes of the position of a communication slot for a mobile station (100) in the process of time on radio transmission channels (300*a*)–(300*c*) in respective radio zones (200*a*)–(200*c*) in one embodiment of the personal handy phone system according to the present invention.

Specifically, FIG. 4 illustrates by way of example that a second slot on a radio transmission channel (300*a*) at frequency f1 is allocated as a communication slot for the mobile station (100) in a radio zone (200*a*) formed by a base station (400*a*). In this case, an adjacent base station (400*b*), installed in the middle of a moving direction of the fast moving mobile station (100) under communication, allocates a second slot on the radio transmission channel (300*a*) at frequency f1 used by the mobile station (100) in the radio zone (200*a*) to which the mobile station (100) has so far belonged, as a communication slot for the mobile station (100) in the radio zone (200*b*) formed by the base station (400*b*), at a timing (t1) at which a previously estimated time period T has elaspsed. The time period T has been set as a time period required for the mobile station (100) to move from the radio zone (200*a*) to the radio zone (200*b*). At the next timing (t2) at which another time period T has elapsed, the next adjacent base station (400*c*), installed in the middle of the moving direction of the fast moving mobile station (100) under communication, allocates the second slot on the radio transmission channel (300*a*) at frequency f1 used by the mobile station (100) in the radio zone (200*b*) to which the mobile station (100) has so far belonged, as a communication slot for the mobile station (100) in the radio zone (200*c*) formed by the base station (400*c*).

By performing similar operations in a chain manner along a moving route of the mobile station (100), the fast moving mobile station (100) under communication is permitted to occupy the same slot at the same frequency on radio transmission channels in destination radio zones in succession.

Also, as the mobile station (100) moves from the radio zone (200*a*) to the adjacent radio zone (200*b*) and further to the radio zone (200*c*) in succession at a high speed, the radio signal delay control units (440) provided in the respective base stations (400*a*)–(400*c*) control the timing of transmitting radio signals to the respective subordinate radio transmission channels (300*a*)–(300*c*) from the base station (400*a*)–(400*c*) in accordance with previously set values for the base stations (400*a*)–(400*c*), whereby the phases of the communication slots on the radio transmission channels (300*a*)–(300*c*) transmitted from the respective base stations (400*a*)–(400*c*), viewed from the fast moving mobile station (100) under communication, can be all synchronized with each other.

Figure 5:
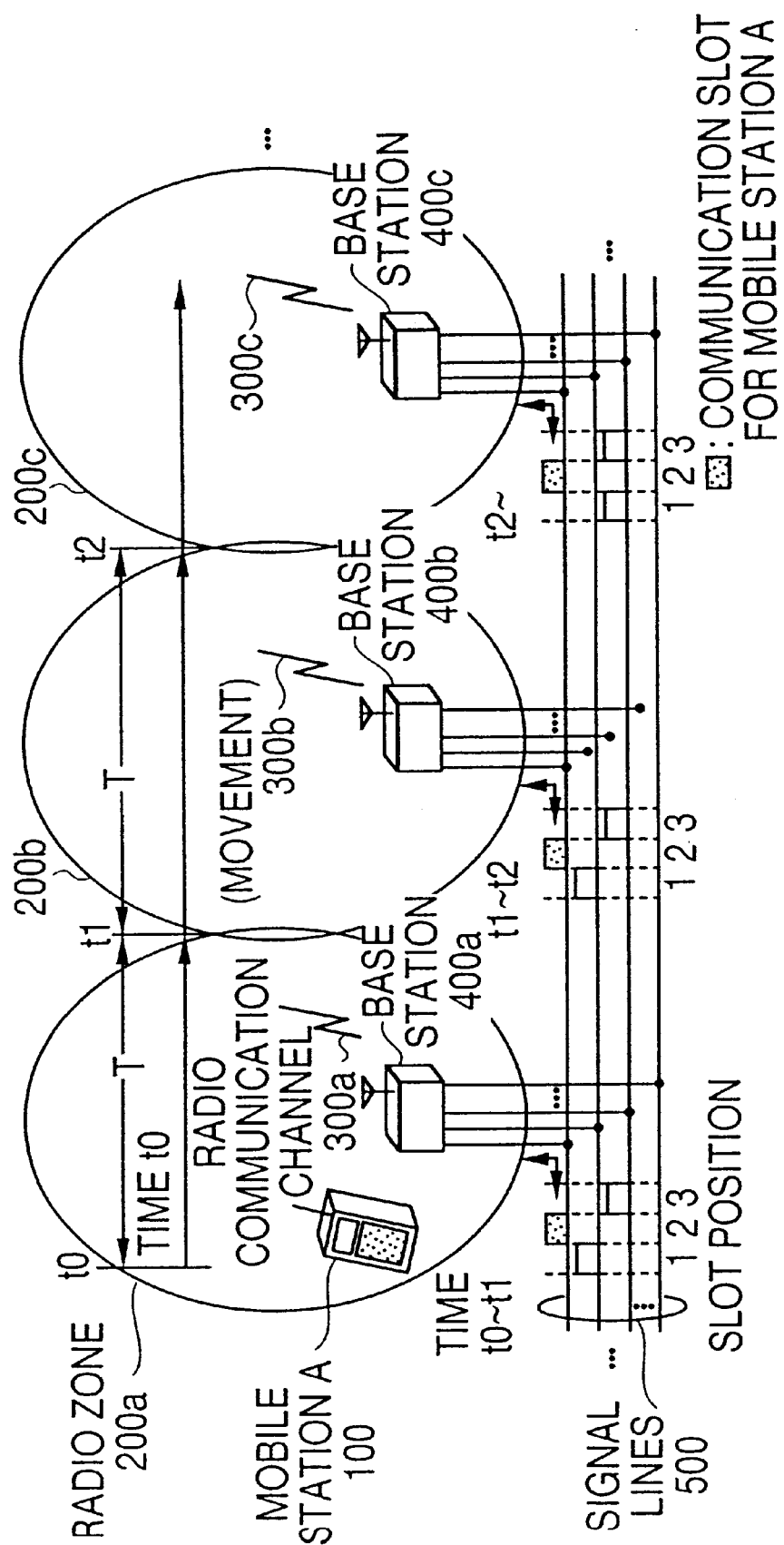
FIG. 5 is a diagram illustrating changes, in the process of time, of the position of a communication lot for a mobile station occupying on a signal line in the respective base stations in one embodiment of the personal handy phone system according to the present invention.

FIG. 5 is a diagram illustrating changes, in the process of time, of the position of a communication slot for a mobile station (100) occupying on a signal line in the respective base stations (400*a*)–(400*c*) installed along a moving route of the mobile station (100) in one embodiment of the personal handy phone system according to the present invention.

Specifically, FIG. 5 illustrates by way of example that in a base station (400a), a second slot on a line No. 1 is allocated as a communication slot on the signal line (500) for the mobile station (100). In this case, an adjacent base station (400b), installed in the middle of a moving route of the fast moving mobile station (100) under communication, allocates a second slot at a line No. 1 used by the mobile station (100) in the base station (400a) to which the mobile station (100) has so far belonged, as a communication slot for the mobile station (100), at a timing (t1) at which a previously estimated time period T has elapsed. The time period T has been set as a time period required for the mobile station (100) to move from the radio zone (200a) to the radio zone (200b). At the next timing (t2) at which another time period T has elapsed, the next adjacent base station (400c), installed in the middle of the moving route of the mobile station (100), allocates the second slot on the line No. 1 used by the mobile station (100) in the base station (400b) to which the mobile station (100) has so far belonged, as a communication slot for the mobile station (100).

By performing similar operations in a chain manner along the moving route of the mobile station (100), the fast moving mobile station (100) under communication is permitted to occupy the same slot at the same frequency on the same signal line in the destination base stations in succession.

As described above, a fast moving mobile station (100) under communication is permitted to continue a communication successively through destination base stations without requiring the intervention of special processing controls on the network side or without performing any handover operation required by the fast movement of the mobile station (100). In addition, since all the phases of communication slots on the radio transmission channels transmitted from the respective base stations can be synchronized with each other, it is possible to realize the insurance of a precise communication quality with less call interruptions and less introduced noise even during the fast movement of the mobile station.

Figure 6:
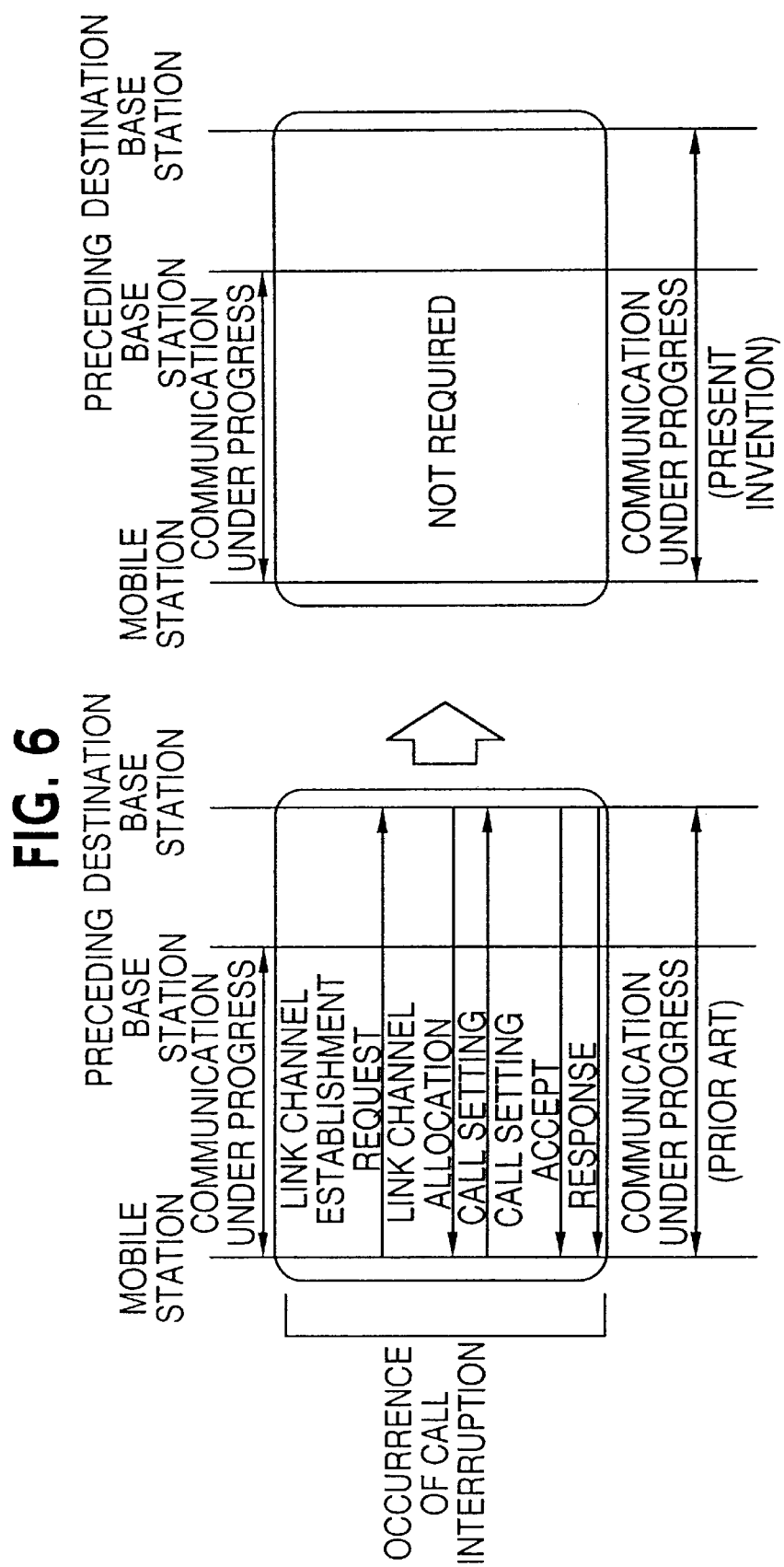
FIG. 6 shows a comparison between a conventional system and the system according to the present invention in terms of a radio zone switching processing sequence.

FIG. 6 shows a comparison between a conventional personal handy phone system and the personal handy phone system according to the present invention in terms of a processing sequence between a mobile station and base stations when the mobile station switches a radio zone to which it belongs.

As shown in FIG. 6, the-conventional personal handy phone system requires a re-call handover operation-for switching a radio zone to which a mobile station belongs. More specifically, since a sequence of a link channel establishment request, a link channel allocation, a call setting, a call setting reception and a response is required between the mobile station and a destination base station, a call is interrupted during the execution of this sequence. On the other hand, the personal handy phone system of the present invention need not perform the handover operation as mentioned above and accordingly does not require the sequence of operations associated with the handover operation, so that no interruption occurs in a call during the switching of a radio zone to which a mobile station belongs.

Figure 7:
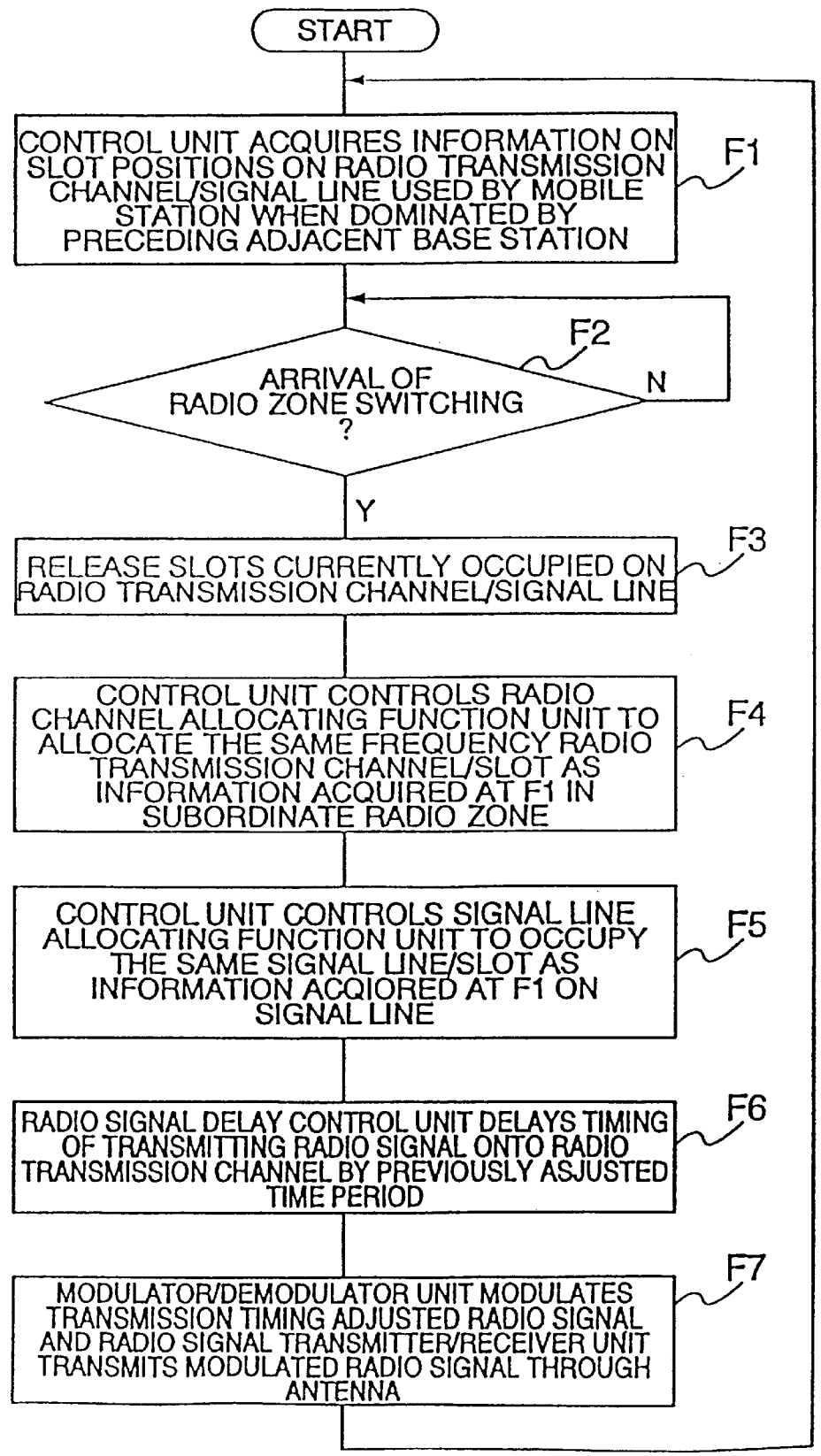
FIG. 7 represents an exemplary flow of operations performed by each base station in the personal handy phone system according to the present invention.

FIG. 7 represents a flow of specific operations performed by each base station in the personal handy phone system according to the present invention. Specifically, this flow shows a processing flow in an arbitrary base station within a plurality of base stations installed along a moving direction of a mobile station.

A control unit in the base station acquires, through a signal line (500), information on a frequency of a radio transmission channel and the position of a communication slot on the radio transmission channel used by a mobile station dominated by an adjacent base station located in the direction opposite to the moving direction of the mobile station, i.e., a preceding adjacent base station from which the mobile station is moving thereto, and information on a signal line number and the position of a communication slot on the signal line (step F1).

A required time period (particular fixed value) for the mobile station to move between adjacent radio zones is calculated from an assumed moving speed (particular fixed value) of the mobile station and the installation interval of base stations (400a)–(400c), and communication slots for each mobile station on a radio transmission channel and on a signal line is transferred between the respective base stations for switching a radio zone to which the mobile station belongs at the timing at which the estimated moving time has elapsed. Thus, the control unit in the base station monitors the arrival of the radio zone switching timing (the lapse of a particular fixed time period) (step F2).

When the radio zone switching timing has reached, the control unit in the base station controls a radio channel allocating function unit and a signal line allocating function unit to release communication slots occupied on the radio transmission channel and on the signal line used for a mobile station which has so far belonged to the associated radio zone (step F3).

The control unit in the base station controls the radio channel allocating function unit to allocate the same slot on the radio transmission channel at the same frequency as a communication slot for the mobile station which has moved into the radio zone covered by the base station, in accordance with the information acquired at step (F1) on the frequency of the radio transmission channel and the position of the communication slot on the radio transmission channel used by the mobile station when dominated by the preceding adjacent base station (step F4).

The control unit in the base station controls the signal line allocating function unit to occupy the same slot on the same signal line as a communication slot for the mobile station which has moved into the radio zone covered by the base station, in accordance with the information acquired at step (F1) on the signal line number and the position of the communication slot on the signal line used by the mobile station when dominated by the preceding adjacent base station (step F5).

A radio signal delay control unit in the base station delays a transmission timing by a previously adjusted set time period so as to synchronize the phase of the communication slot on the radio transmission channel with that of the adjacent base station, when the base station sends the communication slot onto the radio transmission channel for the mobile station which has come into the radio zone covered by the base station (step F6).

A modulator/demodulator unit modulates a radio signal having the transmission timing delayed by the adjustment to be sent to the radio transmission channel, and the modulated signal is sent onto the radio transmission channel from a radio signal transmitter/receiver unit through an antenna (step F7).

Subsequently, the flow returns to step F1 to repeat the procedure of steps F1–F7.

According to the foregoing embodiment, it is possible to suppress occurrence of the handover operation performed in a fast moving mobile station under communication, thereby making it possible to reduce call interruptions caused by the handover operation and to realize the insurance of a precise communication quality for the fast moving mobile station in the mobile radio communications system.

What is claimed is:

1. A mobile radio communications system comprising:

a plurality of base stations which are installed along a moving direction of a plurality of mobile stations being accommodated through radio transmission channels, wherein each one of said base stations autonomously allocates a frequency of one of said radio transmission channels and a time slot on the one radio transmission channels, used by one of said mobile stations dominated by said base station, in accordance with a lapse of a fixed time period calculated from a previously assumed moving speed of a mobile station under communication.

2. A method of switching a radio zone for a mobile station communications system having a plurality of base stations which are installed along a moving direction of a plurality of mobile stations being accommodated through radio transmission channels, said method comprising the steps of:

autonomously allocating, in each of said base stations, a frequency and a time slot on one of the radio transmission channels, used by a mobile station dominated by said base station, in accordance with a lapse of a fixed time period calculated from a previously assumed moving speed of a mobile station under communication.

* * * * *